United States Patent
Kona et al.

(10) Patent No.: US 11,298,987 B2
(45) Date of Patent: Apr. 12, 2022

(54) METHOD OF DETERMINING THE HEALTH OF A SEAL IN A TIRE INFLATION SYSTEM

(71) Applicant: Dana Heavy Vehicle Systems Group, LLC, Maumee, OH (US)

(72) Inventors: Venkata Ramakanth Kona, Maumee, OH (US); Christopher P. Lewark, Grand Rapids, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 199 days.

(21) Appl. No.: 16/842,327

(22) Filed: Apr. 7, 2020

(65) Prior Publication Data

US 2020/0324585 A1    Oct. 15, 2020

Related U.S. Application Data

(60) Provisional application No. 62/831,396, filed on Apr. 9, 2019.

(51) Int. Cl.
   *B60C 23/00*       (2006.01)
   *F16J 15/3296*     (2016.01)
   *B60C 23/04*       (2006.01)

(52) U.S. Cl.
   CPC ...... *B60C 23/002* (2013.01); *B60C 23/00363* (2020.05); *B60C 23/0479* (2013.01); *F16J 15/3296* (2013.01)

(58) Field of Classification Search
   None
   See application file for complete search history.

(56) References Cited

U.S. PATENT DOCUMENTS

| | | | | |
|---|---|---|---|---|
| 5,121,774 A * | 6/1992 | Hicks | B60C 23/00372 | 141/4 |
| 5,179,981 A * | 1/1993 | Hicks | B60C 23/00354 | 141/4 |
| 5,249,609 A * | 10/1993 | Walker | B60C 23/00354 | 141/4 |
| 5,309,969 A * | 5/1994 | Mittal | B60C 23/00318 | 152/415 |
| 5,556,489 A * | 9/1996 | Curlett | B60C 23/133 | 152/418 |
| 5,694,987 A * | 12/1997 | Marchart | B60C 23/16 | 141/38 |
| 8,988,209 B2 * | 3/2015 | Cantarelli | B60C 23/0494 | 340/455 |
| 2002/0166411 A1 * | 11/2002 | White | F16H 57/027 | 74/607 |

(Continued)

*Primary Examiner* — Muhammad Adnan
(74) *Attorney, Agent, or Firm* — McCoy Russell LLP (57) ABSTRACT

Systems and methods for determining the health of a seal in a tire inflation system are provided. In one example, a method of determining the health of a seal of a tire inflation system on a vehicle includes obtaining one or more pressure measurements of a tire of the vehicle with a pressure transducer in communication with an electronic control unit and sending the one or more pressure measurements to a computer network via a communication network that receives signals from the electronic control unit, the communication network including a telematics device in communication with the computer network, wherein the computer network is configured to determine the health of the seal based on the one or more pressure measurements communicated by the telematics device.

12 Claims, 6 Drawing Sheets

(56) References Cited

U.S. PATENT DOCUMENTS

| | | | |
|---|---|---|---|
| 2007/0193349 A1* | 8/2007 | Petrucelli | B60C 23/0408 |
| | | | 73/146.8 |
| 2014/0076456 A1* | 3/2014 | Kranz | B60C 23/00354 |
| | | | 141/4 |
| 2015/0136270 A1* | 5/2015 | Keane | B60C 23/00372 |
| | | | 141/4 |
| 2018/0141393 A1* | 5/2018 | Gillen | G05D 16/2033 |

* cited by examiner

METHOD OF DETERMINING THE HEALTH OF A SEAL IN A TIRE INFLATION SYSTEM

CROSS-REFERENCE TO RELATED APPLICATIONS

The present application claims priority to U.S. Provisional Application No. 62/831,396, entitled "Method of Determining the Health of a Seal in a Tire Inflation System", and filed on Apr. 9, 2019. The entire contents of the above-listed application are hereby incorporated by reference for all purposes.

FIELD

The present disclosure relates to tire inflation systems and to a pressure supply control system. More particularly, the present disclosure relates to a method of determining the health of a seal in a tire inflation system.

BACKGROUND

Tire inflation systems for vehicles provide a vehicle the versatility of adjusting tire pressures while the vehicle is stationary or in motion. Advantageously, utilizing a tire inflation system may eliminate the need to manually check the tire pressure of each tire and manually adjust the tire pressure and may reduce maintenance requirements.

Tire inflation systems known in the art typically include one or more rotary air seals. Rotary air seals are provided to allow pressurized air to be transferred from a stationary portion of the system to a rotating portion of the system and vice versa. The rotary air seals are often the first component of a tire inflation system to exhibit degradation. Degradation of a rotary air seal may prevent the tire inflation system from being able to measure, increase, or decrease the tire pressure. Degradation of the rotary air seals may also cause other components of the tire inflation system to wear unnecessarily, which can shorten the effective life of those components. Therefore, it would be beneficial to provide a method for determining the health of a seal so that the seal can be repaired or replaced before seal degradation occurs.

SUMMARY

In an embodiment, the present disclosure provides for a method of determining the health of a seal of a tire inflation system on a vehicle. The method includes obtaining one or more pressure measurements of a tire of the vehicle with a pressure transducer in communication with an electronic control unit and sending the one or more pressure measurements to a computer network via a communication network that receives signals from the electronic control unit, the communication network including a telematics device in communication with the computer network, wherein the computer network is configured to determine the health of the seal based on the one or more pressure measurements communicated by the telematics device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Systems and methods are provided herein for determining the health of one or more rotary air seals in one or more tires of a vehicle, where the vehicle uses a tire inflation system to monitor and adjust the pressure in a plurality of tires while the vehicle is being operated. With respect to rotary air seals, "health" may be defined as the seal's ability to maintain tire pressure by preventing air from passing through the seal (e.g., to atmosphere) between the rotating portion of the tire inflation system and the stationary portion of the tire inflation system. The health of a seal may be determined as a binary result (e.g., functional seal or degraded seal), as a non-binary measurement of the seal's ability to maintain/transmit pressure expressed as a percentage, ratio, or other similar comparison with expected performance, or as a numerical measurement expressing a quantification of pressure loss, or any other similar measurement or assessment. In the case of a binary determination of seal health, seal degradation may be determined by the seal's inability to maintain pressure within threshold pressure values.

The health of one or more rotary air seals may be determined by an electronic control unit located in the vehicle, or by a remote processing unit located outside the vehicle and accessed via a telematics device that communicates with an external processor over a computer network. In some embodiments, a remote processing device may be monitoring the health of a plurality of seals on a plurality of vehicles for fleet management purposes. For example, information may be collected on a vehicle's speed, temperature, duration of operation, and so on via internal sensors, and/or on the type or quality of road surface, external temperature, or other factors via external sensors. Sensor information may be aggregated remotely over a plurality of vehicles and over an extended period of time to determine seal degradation patterns.

The health of one or more rotary air seals may be displayed on a display device in the vehicle to indicate to an operator (e.g., a driver) that a seal has degraded or that a seal is exhibiting some degree of degradation. In the event that a seal is in a state of partial degradation (e.g., measured pressure is below a threshold during some health checks), instructions or other information may be presented on a display device in the vehicle to allow the operator to take appropriate measures, such as increasing the tire pressure or altering the frequency with which tire pressure is checked. In other embodiments, an external processor and/or the electronic controller in the vehicle may automatically initiate appropriate actions. For example, if a seal is showing signs of degradation and tire pressure is not being maintained, the electronic controller may automatically increase tire pressure to compensate. In such cases, a notification may be displayed to the operator via a display device.

Figure 1:
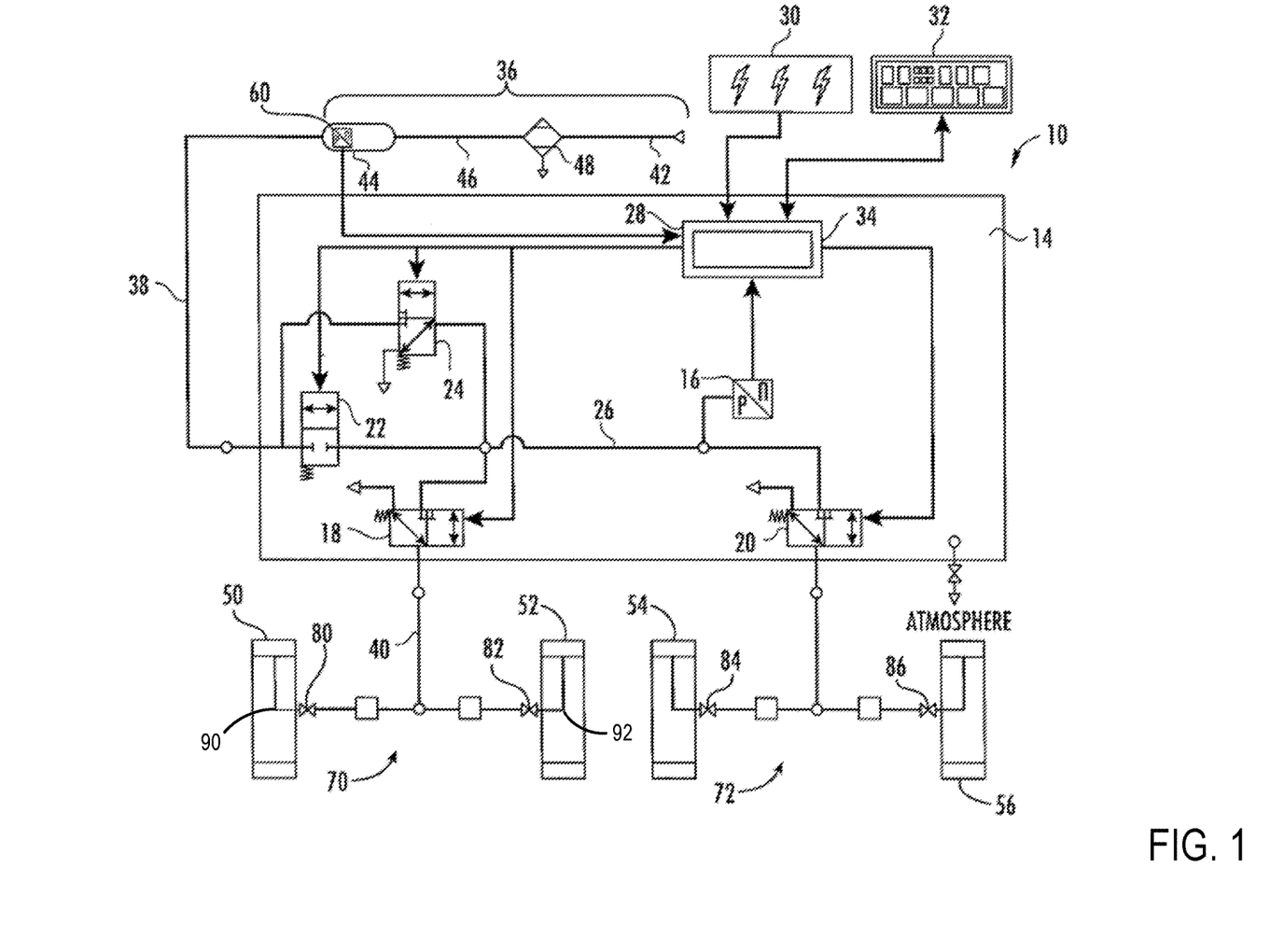
FIG. 1 is a schematic view of a tire inflation system, including a control unit, external inputs, and a connected wheel assembly with associated conduits and seals.

In FIG. 1, embodiments of tire inflation system 10 are described. In certain embodiments, the tire inflation system 10 is utilized with a vehicle (as depicted in FIG. 1). The tire inflation system 10 may be a central tire inflation system (CTIS) for a commercial vehicle. In addition, the tire inflation system 10 described herein may have applications in both light duty and heavy duty-vehicles, and for passenger, off-highway, and sport utility vehicles. The tire inflation system 10 may have industrial, locomotive, military, agricultural, and aerospace applications.

The tire inflation system 10 is described herein with reference to a pressurized fluid such as, for example, air. The tire inflation system 10 may have inflate and/or deflate capability to allow a tire pressure to be increased and/or decreased.

As illustrated in FIG. 1, the tire inflation system 10 may comprise a control unit 14. In an embodiment, the control unit 14 comprises a plurality of valve assemblies 18, 20, 22, 24, which may be of the solenoid variety. The control unit 14 further comprises a control unit first conduit 26 in fluid communication with the valve assemblies 18, 20, 22, 24. The control unit first conduit 26 is utilized for controlling the flow of, and directing, pressurized fluid through the system 10. In an embodiment, the control unit 14 may comprise a mechatronic control unit (MCU). In another embodiment, the control unit 14 may comprise a pneumatic control unit (PCU) coupled with an electronic control unit (ECU).

As illustrated in FIG. 1, the control unit 14 comprises an electronic control portion 28. The electronic control portion 28 may include a tangible and non-transient computer readable medium (memory) in which programming instructions are stored. Additionally or alternatively, the example methods and systems may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). As used herein, the term non-transitory computer readable medium is expressly defined to include any type of computer readable medium and to exclude propagating signals. Memory and processors as referred to herein can be standalone or integrally constructed as part of various programmable devices (e.g., computers).

The electronic control portion 28 may receive input signals from a first pressure transducer 16, a power supply 30, and one or more additional sensors such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The memory may store identification codes, tire pressure records, and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The first pressure transducer 16 is in fluid communication with the control unit first conduit 26 and measures the pressure of the air supply 36 via the air supply circuit 38 and the control unit first conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 provides storage of pressurized fluid such as, but not limited to, air or nitrogen. In an embodiment, the air supply 36 comprises an air compressor 42 attached to the vehicle. The air supply 36 may also comprise a fluid reservoir 44 such as a wet tank (also called supply tank). The compressor 42 is in fluid communication with the reservoir 44 via a supply conduit 46. The air compressor 42 supplies pressurized air to the reservoir 44 for storage therein. In certain embodiments, a drier 48 is provided between the air compressor 42 and the reservoir 44 for removing water from the air supply 36. Pressurized fluid from the air supply 36 is provided to the air supply circuit 38 via the reservoir 44. A filter (not depicted) may also be interposed in the air supply circuit 38 or the supply conduit 46. Pressurized air from the air supply may also be used to pneumatically control the opening and closing of wheel valves such wheel valves 80, 82, 84, and 86.

The control unit 14 is also selectively in fluid communication with the fluid control circuit 40. The fluid control circuit 40 is utilized to provide fluid communication between the control unit 14 and one or more tire channels 70, 72. In an embodiment, first and second tires 50, 52 are in fluid communication with the first channel 70, and third and fourth tires 54, 56 are in fluid communication with the second channel 72. In an embodiment, fluid communication between the control unit 14 and fluid control circuit 40 is controlled by opening or closing a channel valve assembly 18.

Each tire 50, 52, 54, 56 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased.

As illustrated in FIG. 1, in an embodiment, the air supply 36 may include a second pressure transducer 60. The second pressure transducer 60 may be disposed at least partially within the reservoir 44. Further, the second pressure transducer 60 is in electrical communication with the electronic control portion 28. The second pressure transducer may be utilized to determine the exact fluid pressure in the air supply reservoir 44. With the second pressure transducer 60, the tire inflation system 10 can constantly provide the available pressure in the air supply reservoir 44.

Each tire's pressure check (i.e., tire pressure measurement routine) involves drawing a small volume of pressurized air into the air supply circuit 38, the control unit first conduit 26, and the fluid control circuit 40, opening the wheel valves, and measuring the pressure in control unit first conduit 26 after equalization with the tire pressure. After the tire pressure checks, the small volume of pressurized air is dumped to the atmosphere. In an embodiment, the pressure checks for all tires are performed simultaneously, rather than checking the pressure of a few tires and then waiting for the pressure in the air supply reservoir 44 to sufficiently recharge in order to check the pressures of the remaining tires. The tire pressure checks are performed in sequence without pauses, for lack of air supply pressure, in between successive channels.

As described above, during pressurization, air flows from the air supply reservoir 44 through supply circuit 38 to control unit 14. When the control unit opens valve assemblies 18 and 20, pressurized air from control unit first conduit 26 flows via fluid control circuit 40 and tire channels 70 and 72 to wheel valves 80, 82, 84, and 86 at tires 50, 52, 54, and 56, respectively. Rotary air seals are positioned between the rotating portion and the stationary portion of the tire inflation system, e.g., between the wheel and the axle, as indicated in FIG. 1 at rotary air seals 90 and 92 on tire channel 70. Pressurized air enters rotary air seals 90 and 92 via wheel valve 80 and 82, respectively, which are opened and/or closed by the electronic control portion 28 of control unit 14. While FIG. 1 shows each wheel valve coupled between a respective air seal and a fluid control circuit (e.g., wheel valve 80 is coupled between rotary air seal 90 and fluid control circuit 40), in some examples, each rotary air seal may be coupled between a respective wheel valve and a fluid control circuit (e.g., rotary air seal 90 may be coupled between wheel valve 80 and fluid control circuit 40).

In some embodiments, wheel valves 80 and 82 may be check valves (e.g., Schrader valves) that open when the pressure in channel 70 exceeds a threshold value (e.g., 100 psi) and/or that open when the pressure in channel 70 is greater than the pressure in the corresponding tire (e.g., wheel valve 80 may open when pressure in channel 70 exceeds the pressure in tire 50). For example, in order to perform a tire pressure check on tires 50 and 52 as described above, the control unit 14 may draw a small volume of pressurized air above a threshold value of 100 psi into the air supply circuit 38, the control unit first conduit 26, the fluid control circuit 40, and tire channel 70, thus momentarily opening wheel valves 80 and 82 and allowing pressurized air to flow through air seals 90 and 92 into the tires 50 and 52. When wheel valves 80 and 82 open, the pressure in the 50 and 52 momentarily equalizes with the pressure in tire channel 70, fluid control circuit 40, and control unit first conduit 26, allowing the tires to be measured at pressure transducer 16. After the pressure transducer 16 sends the tire pressure measurement to electronic control portion 28, the pressurized air in the fluid control circuit 40 and tire channel 70 is released at valve assembly 18, depressurizing control unit first conduit 26, fluid control circuit 40 and tire channel 70. In other embodiments, independent tire channels may be fluidly coupled with each wheel, allowing for individual tire pressure measurements.

In other embodiments, wheel valves 80 and 82 may be valves that are opened and closed via separate pneumatic control channels in fluid communication with a pneumatic control unit (not depicted in FIG. 1). Independent pneumatic control channels may fluidly communicate with each wheel, permitting each wheel valve to open and close independently.

As will be described in more detail below, a tire inflation system such as tire inflation system 10 may be used to assess the health of one or more rotary air seals located between a stationary component and a rotating component of a vehicle using a single pressure sensor at pressure transducer 16, via the methods in FIGS. 3-5. Pressure readings may be recorded and processed either by an electronic control unit in the vehicle, or by a processing unit on an external computer network to which the pressure readings are transmitted via a telematics device. An external processing unit may transmit individual or aggregate seal health information back to a vehicle operator on a vehicle display device, or to an external user (e.g., a fleet manager) via an external display device, as shown below in FIG. 2. The external processing unit may also analyze air seal degradation trends over time, including across vehicles and different environmental conditions, or compare degradation to historical models.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

Figure 2:
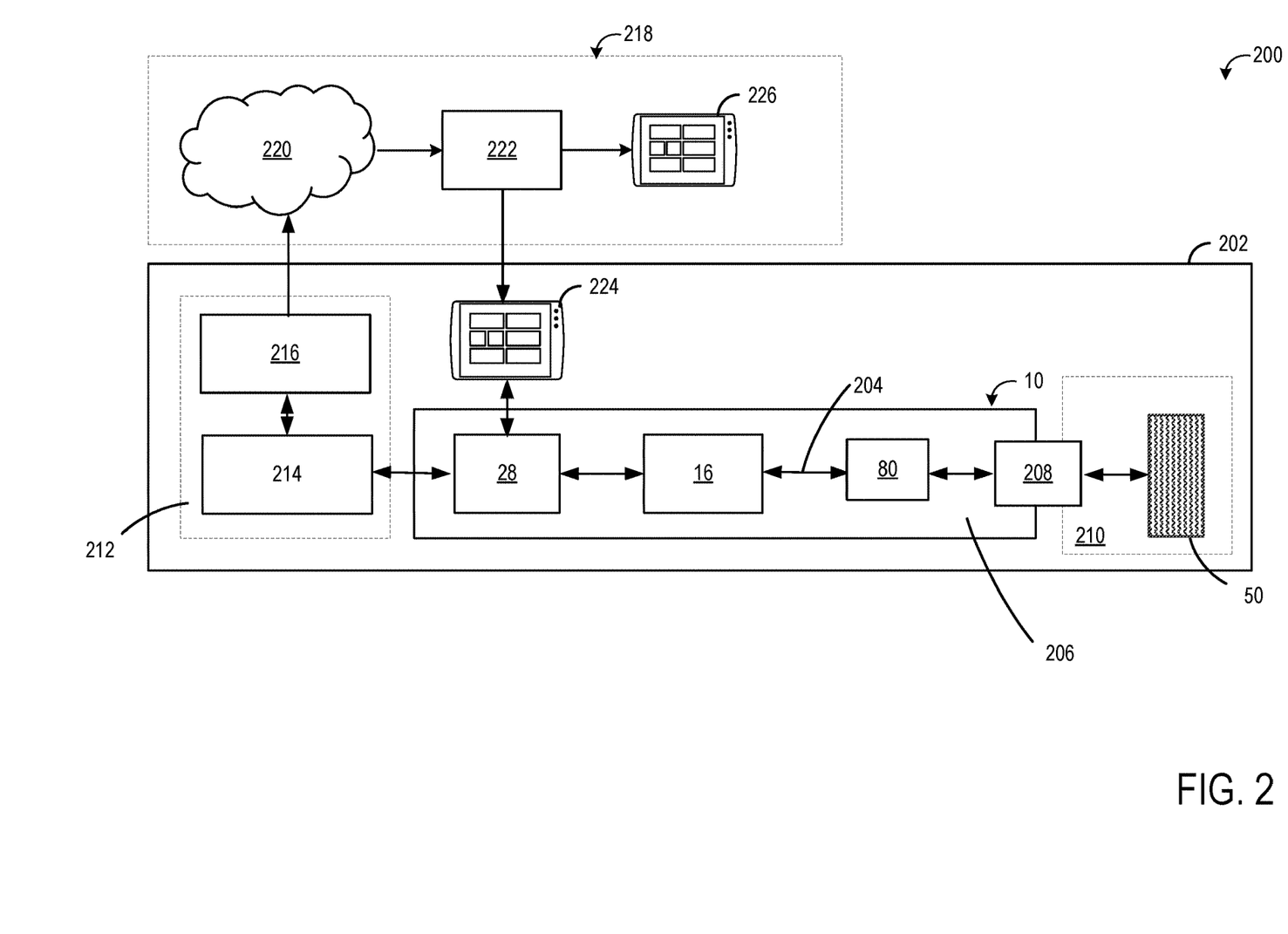
FIG. 2 is a schematic view of a portion of a tire inflation system, a portion of a vehicle, and a computer network in accordance with one or more embodiments of the disclosure described herein.

Moving on to FIG. 2, schematic diagram 200 shows a portion of tire inflation system 10 described above located on a vehicle 202. The tire inflation system 10 can be utilized to determine a tire pressure, increase a tire pressure, or decrease a tire pressure. Increasing the tire pressure is commonly known as inflating a tire and decreasing the tire pressure is commonly known as deflating a tire. Although the tire inflation system will be described in relation to only the one tire 50 shown in FIG. 2, it should be appreciated that the tire inflation system 10 can determine the tire pressure, increase the tire pressure, or decrease the tire pressure of a plurality of tires (not depicted) on a vehicle 202.

The portion of tire inflation system 10 shown in FIG. 2 includes a pressure transducer (sensor) 16 to measure a fluid pressure. In an embodiment, the fluid is air and the fluid pressure measured is indicative of the tire pressure. As used herein, "tire pressure" may refer to a pressure of air or another fluid contained within a tire 50. The fluid pressure measured indicative of the tire pressure will be referred to herein as the "measured tire pressure."

To provide a measured tire pressure, the pressure transducer 16 may measure a fluid pressure within a fluid conduit 204, which is in fluid communication with the tire 50. In embodiments where the pressure transducer 16 is remote from the tire 50, as shown in FIG. 2, the pressure transducer 16 may be selectively in fluid communication with a plurality of tires including tire 50 such that tire pressure can be measured from any tire via pressure transducer 16.

The fluid conduit 204 is in communication with one or more air seals 208, which are located between a stationary portion 206 (e.g., a stator, inside an axle spindle) and a rotating portion (e.g., a wheel) of tire inflation system 10. The air seals 208 ensure that pressurized air flowing from the stationary portion 206 of the tire inflation system 10 to the rotating portion 210 of the tire inflation system 10 does not leak (e.g., to atmosphere). In some embodiments, the one or more air seals 208 may comprise a first air seal and a second air seal. The first air seal and second air seal may be spaced apart and at least partially define a chamber that is in fluid communication with a stationary portion 206 of the tire inflation system 10 and the rotating portion 210 of the tire inflation system 10. To define the chamber, the one or more air seals 208 may be attached to the stationary portion 206 or the rotating portion 210 of the tire inflation system 10 and in sealing contact with the remaining portion 206, 210.

When the one or more air seals 208 are in good condition, it may be assumed that the one or more air seals 208 operate as intended. When the one or more air seals 208 operate as intended, the chamber is sealed to enable pressurized air transfer from the stationary portion 206 of the tire inflation system 10 to the rotating portion 210 of the tire inflation system 10 and vice versa. When the condition of one or more air seals 208 is not good or deteriorating, the chamber may not be sufficiently sealed to enable pressurized air transfer from the stationary portion 206 of the tire inflation system 10 to the rotating portion 210 of the tire inflation system 10 and vice versa.

As described above, tire pressures from a plurality of tires may be provided by pressure transducer 16, where a seal health assessment cycle is iterated over each tire in succession. For example, for each rotary air seal (e.g., tire), a first measured tire pressure may be provided by the pressure transducer 16 at a time T1. Time T1 may be a predetermined time interval. For example, time T1 may occur at vehicle startup. In this embodiment, the second measured tire pressure and the third measured tire pressure may be provided at additional predetermined time intervals T2, T3. The predetermined time interval T2 that the second measured tire pressure is provided at and the predetermined time interval T3 that the third measured tire pressure is provided at may be equal to each other.

The pressure transducer 16 is in electrical communication with electronic control portion 28. The pressure transducer 16 is configured to communicate signals related to information about the measured tire pressures to the electronic control portion 28.

The electronic control portion 28 may also be configured to open the one or more wheel valves 80 (e.g., as described above with respect to FIG. 1) to measure the tire pressure and to flow pressurized air to the tire via the air seals 208. The electronic control portion 28 operates the tire inflation system 10 in response to a set of predetermined instructions, which may also be referred to as software, or in response to an instruction from an operator of the vehicle 202. The electronic control portion 28 may receive input signals from the pressure transducer 16, a power supply such as power supply 30 from FIG. 1, and one or more additional sensors (not depicted in FIG. 2) such as, for example, a load sensor and a speed sensor. The electronic control portion 28 may also receive input signals from an operator control device 224 such as operator control device 32 in FIG. 1, and/or a communication network 212. As discussed above in FIG. 1, the electronic control portion 28 may include a microprocessor and a memory (not depicted in FIG. 2) in which programming instructions are stored. The memory can also store identification codes, tire pressure records and/or user inputs over a period of time.

The electronic control portion 28 may output signals to cause the wheel valves 80 to open, as described in FIG. 1. The electronic control portion 28 may also output signals to operator control device 224, which may include a display device. The display device may be included as a part of the operator control device or a freestanding device. The electronic control portion 28 may also send information that is received by the communication network 212. In an embodiment, electronic control portion 28 is configured to communicate information related to the measured tire pressure(s) to the communication network 212. The electronic control portion 28 may also communicate other information to the communication network 212 related to an inflation event. For example, the electronic control portion 28 can communicate information related to the duration of an inflation event and the total number of inflation events. The electronic control portion 28 may also communicate information related to the vehicle, road, environment, or other factors external to the tire.

The communication network 212 receives information from the electronic control portion 28. In certain embodiments, the communication network 212 comprises a CAN bus 214. The CAN bus 214 is provided on the vehicle 202. Preferably, the CAN bus 214 receives the information related to the measure tire pressure(s) from the electronic control portion 28. Additionally, the CAN bus 214 receives information related to the duration of an inflation event and the total number of inflation events.

The CAN bus 214 may communicate with a telematics device 216. The telematics device 216 may be provided on the vehicle 202. Communication between the CAN bus 214 and the telematics device 216 may be of the two-way variety. In an embodiment, the CAN bus 214 communicates information related to the measured tire pressure(s) to the telematics device 216. The telematics device 216 can store the information related to the measure tire pressure(s). The telematics device 216 can store the information for a predetermined period of time. The telematics device 216 can also delete certain information related to the measured tire pressure(s) and replace the information deleted with new information related to the measured tire pressure(s).

The telematics device 216 may communicate with a computer network 218. The telematics device 216 may communicate information related to the measure tire pressure(s) to the computer network 218. For example, the telematics device 216 may communicate information related to the first measured tire pressure, second measured tire pressure, and third measure tire pressure to the computer network 218. Communication between the telematics device 216 and the computer network 218 may be of the two-way variety. Thus, in certain embodiments, the telematics device 216 may receive communications from the computer network 218. For example, the vehicle may send, via the telematics device 216, tire pressures measured at predetermined time intervals T1, T2, and T3 to the computer network 218, which may compare the tire pressures to historical tire pressure data from the same seal or vehicle, or to tire pressure measurements from similar vehicles, or to target tire pressure measurements, or any other available tire pressure data. The computer network may send notifications or instructions back to the vehicle to be displayed on a display device. In other embodiments, the computer network may send instructions directly to the electronic control unit on the vehicle to increase or decrease tire pressure, reconfigure sensors, compile additional information, or any other instructions that may be processed by the electronic control unit in a non-limitative fashion.

The computer network 218 may comprise a server 220. In some embodiments, communication between the telematics device 216 and the server 220 may be continuous. In other embodiments, communication between the telematics device 216 and the server 220 may be selective. In one such embodiment, communication between the telematics device 216 and the server 220 may occur at predetermined time intervals. For example, the telematics device 216 and the server 220 may communicate once every 15 minutes. In some examples, the computer network 218 is not provided on the vehicle 202.

In some embodiments, the server 220 communicates with a central computer 222 where tire pressure measurements are processed and air seal health is assessed. Communication between the server 220 and the central computer 222 may be of the two-way variety. In an embodiment, the central computer 222 may be utilized to monitor a single vehicle. In other embodiments, the central computer 222 may be utilized to monitor and control a fleet of vehicles. In this embodiment, the central computer 222 may be a fleet management controller.

The central computer 222 may be utilized to determine the health or condition of one or more air seals 208 based on the information communicated by the telematics device 216. To determine the condition of an air seal 208, a measured tire pressure is compared to threshold values. For example, in certain embodiments, the measured tire pressure is compared to a first threshold pressure value and a second threshold pressure value. The first threshold pressure value is less than the second threshold pressure value. In one such embodiment, the first threshold pressure value may be 0 psi and the second threshold pressure value may be 20 psi.

The central computer 222 determines the condition of the air seal 208 based on the relationship between the measured tire pressure and the first threshold pressure value and the second threshold pressure value. For example, if the measured tire pressure is greater than the second threshold pressure value, then the condition of the air seal 208 is determined to be acceptable. As another example, if the measured tire pressure that is greater than the first threshold pressure value and less than the second threshold pressure value, then the air seal 208 is determined to be degraded (e.g., a positive degradation event). When the measured tire pressure is less than or equal to the first threshold pressure value, then the condition of the air seal 208 is determined to be unknown (e.g., as a pressure reading of 0 psi may be indicative of a degraded pressure sensor, a blown out tire, or another issue that may mask detection of seal health). For the purposes of this discussion, "degradation" refers to an air seal's inability to retain pressure/reach the second threshold value discussed above, and "degradation event" refers to evidence of degradation as result of a single test. In certain embodiments, the condition of the air seal 208 may be indicated to the vehicle driver or a user of the central computer 222. As indicated above, an alarm or notification can be provided when the rate of degradation for the air seal 208 is greater than a threshold rate. Alternatively, messages indicating a particular condition for the air seal 208 can be provided to the vehicle driver via operator control device 224, and/or the user of the central computer at operator control device 226. For example, a message indicating that the air seal 208 was in good health or bad health may be provided. In other embodiments, a message indicating that monitoring, maintenance, or some other action of the air seal 208 is indicated may be provided.

Figure 3:
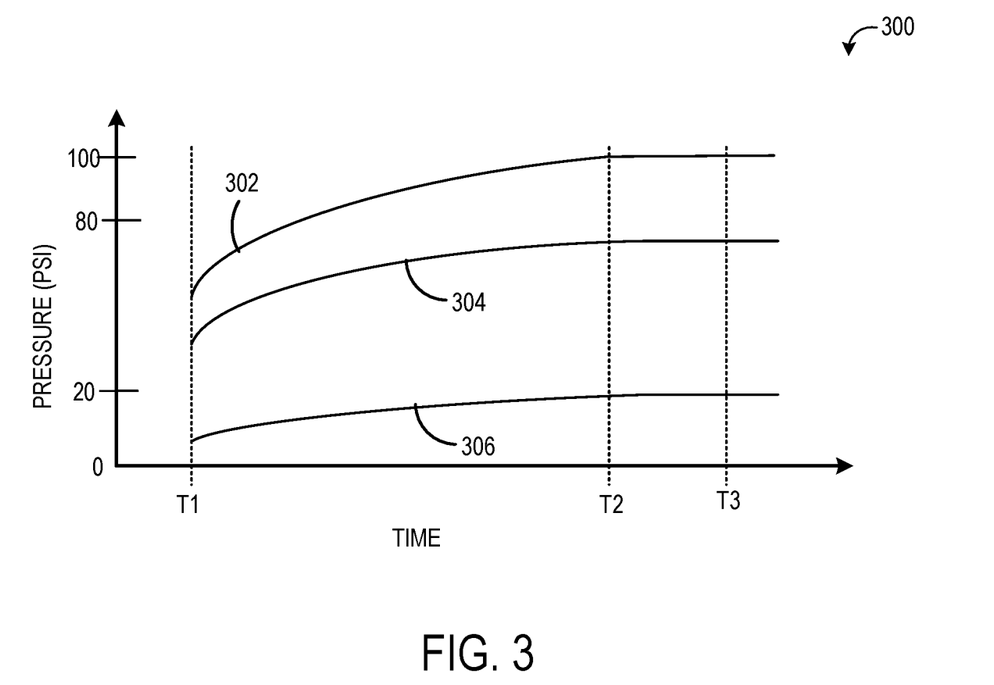
FIGS. 3 and 4 show example graphs of pressure measurements and degradation events, respectively.

FIG. 3 shows an example of how a processor such as central computer 222 may determine seal health from multiple tire pressure measurements, according to the thresholds discussed above. Graph 300 shows a graphical depiction of an example degradation test based on tire pressure measurements taken at three time intervals T1, T2, and T3, where T1 is at startup, T2 is when full inflation is achieved (e.g., 30 seconds after initiation of inflation), and T3 is a short time after T2 (e.g., 10 seconds after T2). In some examples, T1 may be vehicle startup, T2 may be 1 minute after T1, and T3 may be 1 minute after T2, or T1, T2, and T3 may be spaced apart by other suitable amounts of time. Pressure values are indicated on the y axis. In this embodiment, inflation is automatic, meaning that tires are re-inflated whenever low tire pressure is detected.

Curve 302 shows a functional rotary air seal, with a tire pressure above a second threshold of 20 psi at T1, at the initiation of inflation. As pressurized air enters the tire and the tire inflates, curve 302 shows tire pressure increasing to achieve target pressure of 100 psi at time interval T2. A subsequent measurement taken at T3 indicates the same tire pressure (100 psi). Two determinations can made from this measurement data. First, the tire pressure at T1, T2, and T3 are above the second threshold value of 20 psi, indicating that the seal health is acceptable. Second, as there is no difference between the pressure measurements at T2 and T3, the seal is effectively retaining tire pressure after full inflation. Thus, in this one degradation test comprising three measurements, the rotary air seal may be determined to be healthy and functioning properly.

Curves 304 and 306 show example pressure measurements that may be observed when a rotary air seal is degraded. Curve 304 includes a pressure above the second threshold of 20 psi at T1. As pressurized air flows into the tire between T1 and T2, the tire pressure increases, but at time interval T2 the tire pressure is measured below the target pressure of 100 psi. The inability to achieve the target pressure of 100 psi control channel pressure by time T2 indicates potential degradation in the rotary air seal. At time interval T3, the tire pressure is unchanged from T2, indicating that pressure in the control channel (e.g., channel 70) is not able to hold up to accurately determine tire pressure. This may be considered a degradation event and may be logged for this tire. Curve 306 shows another degradation event, in which control channel pressure measures below the second threshold of 20 psi at T1. As pressurized air flows into the channel between T1 and T2, the measured pressure increases, and at time interval T2 the pressure is still measured below the second threshold of 20 psi. The inability to achieve the second threshold pressure of 20 psi by T2 indicates degradation in the rotary air seal. At time interval T3, the pressure is unchanged from T2, indicating that channel pressure is unable to reach capacity. This may be considered a degradation event and may be logged for this tire's rotary air seal. It should be appreciated that during the pressure measurement/tire inflation routines depicted by the curves of FIG. 3, pressurized air is supplied to the control channel (e.g., channel 70). If a seal is degraded, the pressurized air may leak to atmosphere and is not supplied to the tire. When the pressure in the control channel is low (e.g., below 80 or 100 psi), the corresponding wheel valve is closed and the pressure sensor is not in communication with the tire. Thus, the pressures depicted by curves 304 and 306 represent channel pressures and the actual pressure of the tire is not known.

It should be appreciated that the systems and methods provided herein may differentiate pressure loss as result of a tire degradation event (e.g. a puncture) from an air seal degradation. Tire degradation events such as blowouts can be ruled out in scenarios in which the vehicle is being driven. Extreme low pressures are noticed by the driver and visually evident after periods during which the vehicle is not used, and render the vehicle inoperable. Minor tire degradation events are identified when tire pressure falls during periods of inactivity (e.g., overnight) but the vehicle remains drivable after pressure checks and inflation. Thus, any pressure losses measured while vehicles are in use are indications of seal health. If telematics data (e.g., the pressure measurements that are sent to the central computer) shows good measured tire pressure values and bad values switching all the time, it may be determined that the seals are degraded. Tire blow out does not recover automatically, so in that case low pressure values are observed all the time. Seals degrade gradually, effected by system conditions (ambient temperature, supply pressure, etc.). Blow outs happen suddenly and never recover. For tire leaks scenario, the tire inflation system may keep inflating and reach the target pressure, but then the pressure drops after a certain time and more drastically for longer durations (e.g., pressure check performed after system turned off overnight). By looking at these trends in the telematics data as described herein, tire degradation vs. seal degradation may be positively differentiated.

A single degradation event may not be evidence of poor seal health. In some cases, a certain number of degradation events may be acceptable before seal health is determined to be poor enough to indicate seal replacement. In such cases, the central computer 222 may analyze a pattern of degradation events in order to determine air seal health. For example, the health of the air seal 208 may be determined by comparing the rate of air seal degradations over a first period of time versus the rate of air seal degradations over a second period of time. The rate at which degradations occur for the air seal 208 may also be compared to a previous rate to determine if the health of the air seal 208 has deteriorated. In yet another embodiment, the rate at which degradations have occurred for the air seal 208 may be compared to a rate at which degradations have occurred for a second air seal. In this embodiment, if the rate at which degradations have occurred for the air seal 208 is greater than a rate in which degradations have occurred for the second air seal, then a subsequent action may be triggered. In further examples, the amount of time spent inflating a tire may be indicative of a degraded seal (e.g., a tire associated with a non-degraded seal may be inflated for 0-10 minutes over a given operational duration, such as 10,000 miles of driving, while a tire associated with a degraded seal may be inflated for 2000 minutes or more over the same operational duration). In still further examples, a total number of inflates that are performed for a tire may be indicative of a degraded seal. For example, a tire associated with a non-degraded seal may be inflated for 0-10 times over a given operational duration, such as 10,000 miles of driving, while a tire associated with a degraded seal may be inflated 1000 or more times over the same operational duration.

Figure 4:
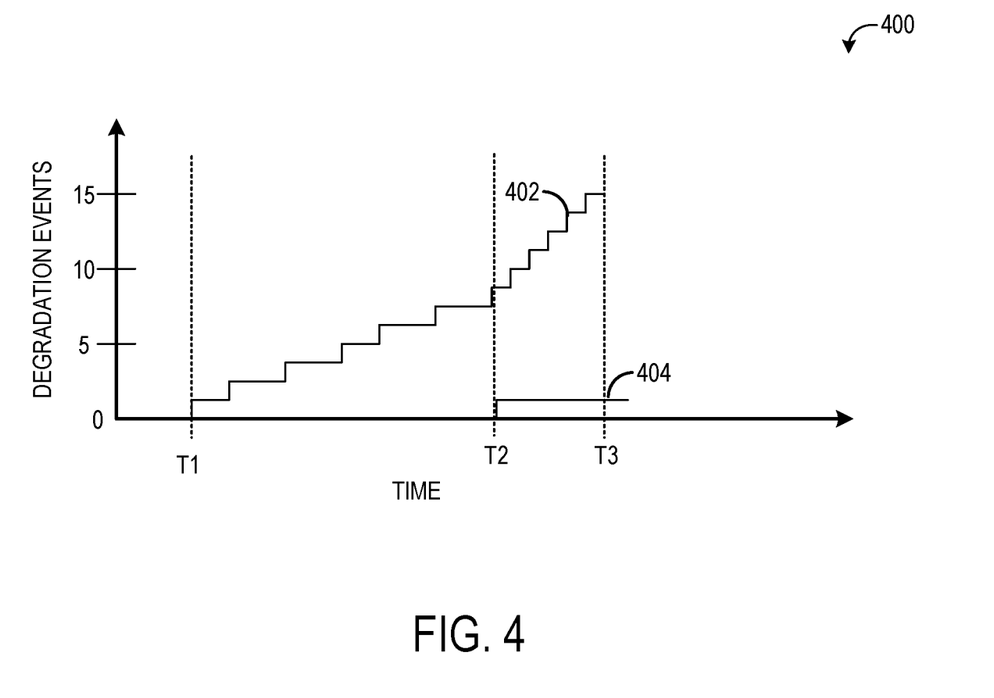

In FIG. 4, graph 400 shows a plot of degradation events over time for a functional seal and for a seal that is starting to degrade. Curve 402 shows the seal that is starting to degrade. Each time a test is carried out for the seal/tire, the result of the test (degraded/not degraded) is logged. The degradation events are plotted (cumulatively) over time, where each horizontal component of the curve represents time, and each vertical component of the curve represents an individual degradation event occurring at the indicated time. Prior to T2, degradation events are less frequent (longer horizontal lines), falling within an acceptable frequency threshold. After T2, it may be seen that a frequency threshold has been exceeded, where the degradation events begin to occur more frequently and at constant time intervals. Thus, over a first duration, the rate of degradation events is lower, indicating that some of the time, the seal is functional enough to pass the tests. Over a second duration, the seal evidences degradation each time a test is performed. In the early stage of degradation, the health of the seal may be estimated based on the rate of degradation events, which may be calculated by fitting a curve to the data. Alternatively or additionally, the number of degradation events may be calculated as a ratio relative to a total number of tests performed or expressed as a percentage. For example, if 100 degradation tests are performed and the seal is indicated as degraded in 10 of those tests, the seal may be indicated as 10% degraded. Once a threshold percentage is reached (e.g., 50%), a notification may be output indicating that the seal is degraded and recommending the vehicle undergo service to replace the seal. In other embodiments, the degradation event frequency patterns may be compared to historical models created from a plurality of air seal failures to determine when seals should be replaced. For example, historical models generated based on prior pressure measurements of other seals as well as information about when the seals were unable to reliably maintain sufficient seal to support automatic tire inflation may be used to estimate a pressure threshold for indicating seal degradation, a rate of degradation events for indicating seal degradation, or other pattern of pressure measurements that may indicate a degraded seal.

In contrast, curve 404 shows a functional seal. Initially, no degradation events are logged, which would be reflected in a horizontal line lying exactly on the horizontal axis at zero between T1 and T2. At T2, a small vertical line indicates that a single degradation event has occurred, followed by a subsequent horizontal line indicating no further degradation events through T3.

Figure 5:
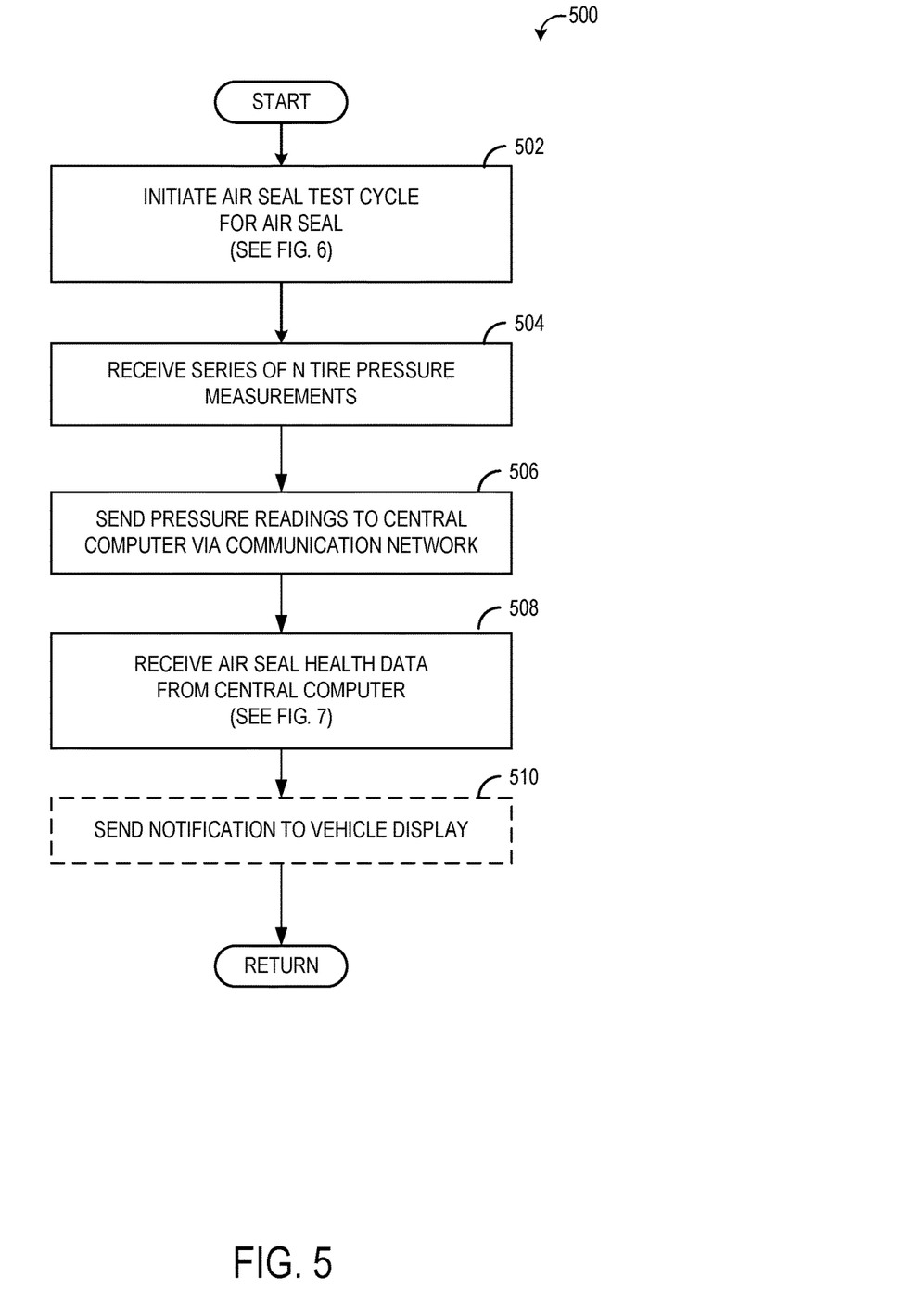
FIGS. 5-7 are flowcharts illustrating example methods for determining the health of a seal of a tire inflation system, according to embodiments of the disclosure.
Figure 6:
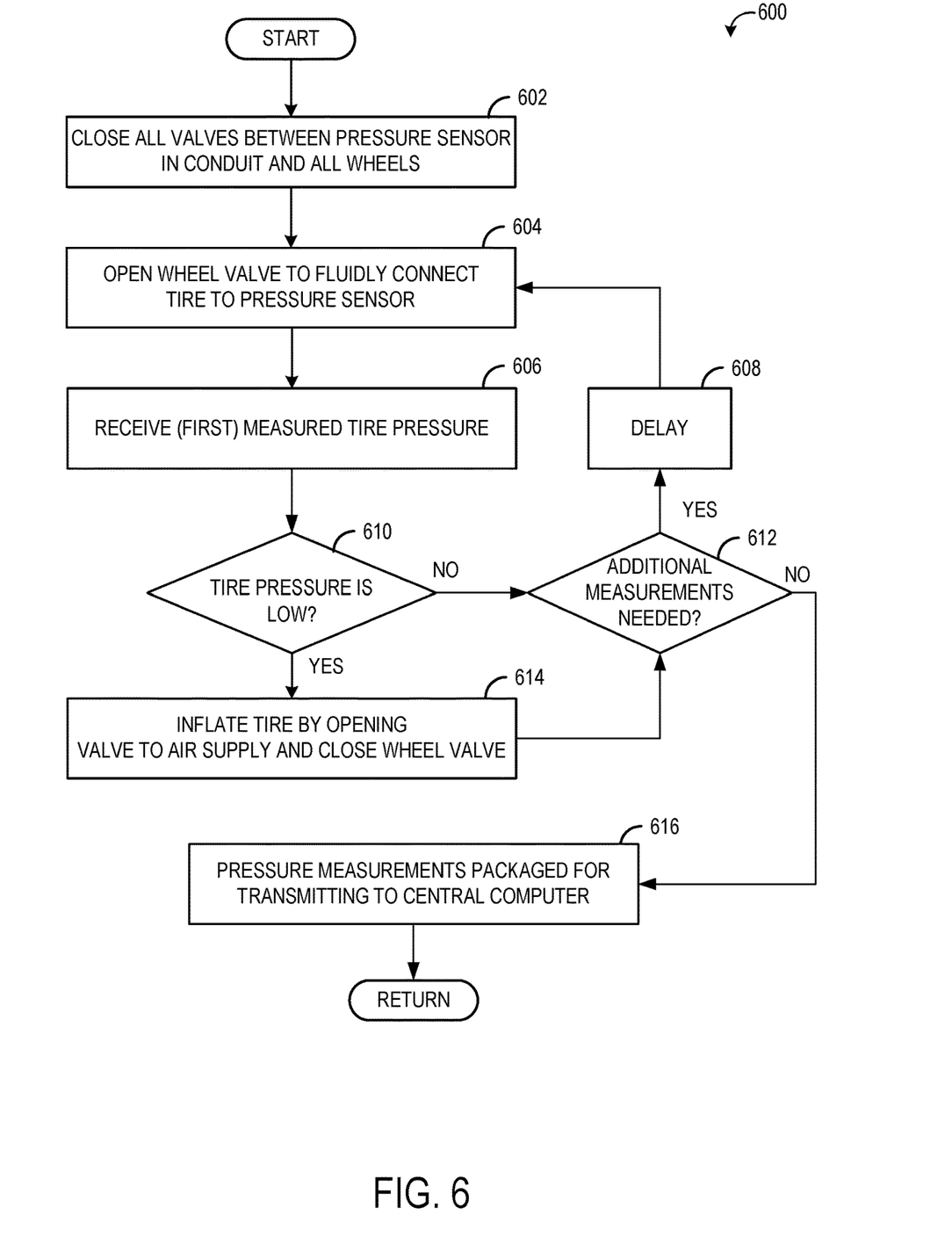
Figure 7:
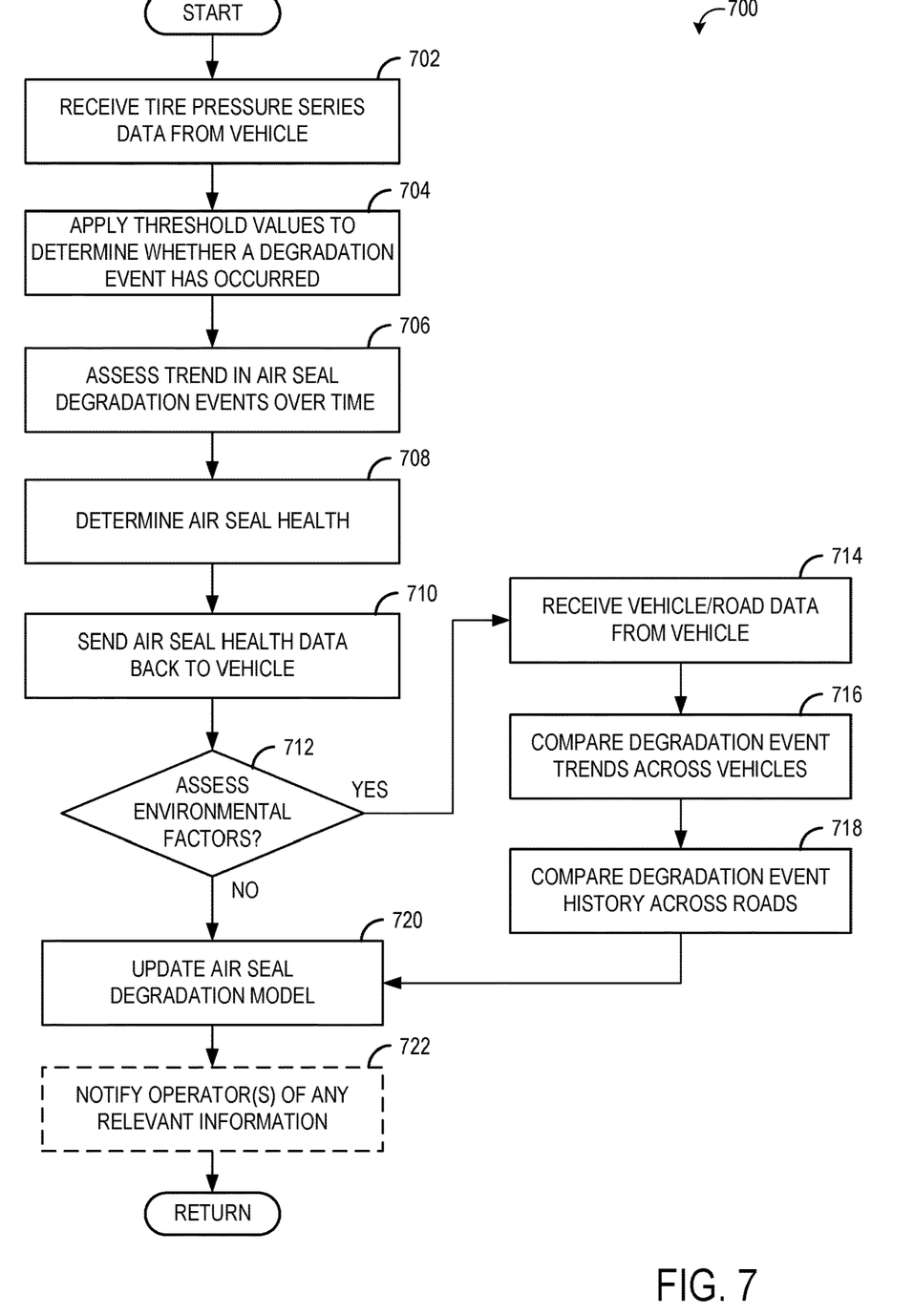

Example methods for the process of determining air seal health are shown in FIGS. 5-7. In FIG. 5, example method 500 shows the process of determining the health of a single air seal while a vehicle is in operation, from the perspective of an electronic control unit such as electronic control portion 28 in vehicle 202. Method 500 may be carried out according to instructions stored in non-transitory memory of an electronic control unit of a vehicle, such as electronic control portion 28. At 502, the electronic control unit initiates a test cycle for an air seal associated with a tire. This test cycle may be run sequentially on other or all tires on the vehicle. Over the course of the test cycle, a predetermined number N tire pressure measurements are made as shown in detail in FIG. 6, which are received at 504. At 506, the electronic control unit sends the pressure measurements via a telematics device such as telematics device 216 to a central computer such as central computer 222 within a communication network such as computer network 218, all from tire inflation system 10 of FIG. 1. The central computer analyzes the tire pressure measurements in order to determine the health of the air seal, as shown in more detail in FIG. 7, which are sent back and received by the electronic control unit at 508. At 510, a notification may be displayed on a display device in the vehicle in response to the received air seal data. For example, the operator of the vehicle may be notified if a seal is determined to be degraded or is on the path to degradation.

FIG. 6 shows an example method 600 for conducting a series of tire pressure measurements for a given rotary air seal such as rotary air seal 208, from the perspective of the electronic control unit. Method 600 may be carried out according to instructions stored in non-transitory memory of an electronic control unit of a vehicle, such as electronic control portion 28. At 602, all valves between a pressure sensor such as pressure sensor 16 in FIG. 1 and all tires within a tire inflation system such as tire inflation system 10 in FIG. 1 are closed, leaving the conduits between the wheel valves and the pressure sensor closed. For example, in a tire inflation system such as tire inflation system 10 and FIG. 1, the wheel valves at 80, 82, 84, and 86 would be closed, as well as valve assemblies 18, 20, and 22.

At 604, the wheel valve located at the tire where the seal is being tested (e.g., wheel valve 80) is opened in order to fluidly connect the tire to the pressure sensor. Further, a valve assembly, such as valve assembly 18, fluidly coupling the wheel valve to the pressure sensor is opened. In doing so, the pressure sensor is exposed to the pressure in the tire (assuming that the seal is not degraded and the wheel valve is exposed to sufficient pressure to open). At 606 the electronic control unit receives a first measurement of the tire pressure from the pressure sensor. At 610, method 600 determines if the tire pressure is low, as determined from the output from the pressure sensor. Low tire pressure may include a pressure below an inflation threshold, such as lower than 85 psi, lower than 50 psi, etc. If the tire pressure is not low (e.g., if the measured tire pressure is equal to or above the inflation threshold), method 600 proceeds to 612 to determine if additional pressure measurements are to be taken, which is explained in more detail below.

If the pressure is low at 610, the tire is inflated at 614 by opening a valve (e.g., valve assembly 22) to an air supply such as air supply 36 of tire inflation system 10 in FIG. 1, while maintaining the valves coupled between the pressure sensor and the tire open, allowing pressurized air to flow into the tire through the air seal. At 612, the electronic control unit determines whether further measurements are to be made, based on a predetermined number of measurements. For example, the predetermined number of measurements may include three or more measurements. In some examples, pressure measurements may continue to be performed until the measured pressure reaches the inflation threshold. If an additional measurement is to be made (e.g., due to fewer than the predetermined number of measurements having been performed and/or due to the measured pressure reaching the inflation threshold), after a delay at 608, another tire pressure measurement is made at 604. The delay may be a suitable delay, such as 30 seconds, 1 minute, 10 minutes, or other suitable amount of time, as described above with respect to time intervals T1, T2, and T3. During the delay, the wheel valve and valve assembly described above may be closed. Then, to perform the additional pressure measurement, the valves coupled between the tire and the pressure sensor are opened (e.g., wheel valve 80 and valve assembly 18) to perform the additional pressure measurement. However, in other embodiments, the valves may remain open (or presumably open, in the case of the wheel valve) while pressure measurements are conducted (e.g., as the tire continues to inflate). Once the predetermined number of measurements have been made or the measured pressure has reached the inflation threshold (e.g., when it is determined at 612 that no additional pressure measurements are to be taken), method 600 proceeds to 616 to package the pressure readings to be transmitted to the central computer via the telematics device, and the method returns. In some examples, the tire inflation system status at the time of the pressure measurement may be sent to the central computer with the pressure measurement, such as an indication of when a tire inflation was most recently performed for that tire and/or an indication of whether automatic tire inflation was disabled (e.g., to allow lower tire pressures for traversing certain terrain). For example, when a tire inflation is performed due to a low initial pressure measurement, the subsequent pressure measurement (e.g., at time T2) may sent to the central computer along with an indication that a tire inflation was performed for that tire just prior to the pressure measurement at T2.

Moving on to FIG. 7, it shows a flowchart illustrating an example method 700 for determining the health of an air seal as carried out by a central computer such as central computer 222 of tire inflation system 10. Method 700 may be performed according to instructions stored in non-transitory memory of a computing device in communication with a vehicle, such as central computer 222. At 702, the central computer receives tire pressure series data from a vehicle, comprising a predetermined number of individual tire pressure measurements as described in method 600 and in some examples, the tire inflation system status at the time of the pressure measurement. At 704, the central computer applies threshold values to the tire pressure measurements to determine whether a degradation event has occurred or not, as discussed earlier in FIG. 3. For example, the central computer may determine whether a given tire pressure measurement falls below a threshold of 20 psi, as discussed above with respect to FIG. 3. However, other thresholds are possible without departing from the scope of this disclosure, such as a pressure threshold of 85 psi, 50 psi, or other suitable threshold. The inability of the tire channel (e.g., channel 70) to become pressurized significantly above atmospheric pressure even when supplied with pressurized air from the onboard air supply may indicate a degraded rotary air seal, as explained above. Thus, the threshold pressure may be a pressure equal to or above atmospheric pressure but below the target tire pressure.

At 706, the degradation determination from a single degradation test is assessed in conjunction with previous degradation events, as described above and shown in FIG. 4. For example, over a given duration, the ratio of degradation events to total tests (or successful tests over total tests) expressed as a percentage may be used as a measurement of seal health. For example, if 1000 tests are performed over a given driving period (e.g., 100 hours of vehicle operation), and 400 tests result in degradation events, seal health may be expressed as a percentage of 60% (number of tests not resulting in degradation events over total tests, multiplied by 100). Further, related data may be compared to indicate seal health, such as number of pressure checks performed, amount of time spent inflating the tire, amount of pressurized air flowed into the tire, or other measurements. For example, if the amount of time spent flowing pressurized air into a tire is low (e.g., under 10 minutes), the air seal may be determined to be healthy, whereas if a large amount of time is spent flowing pressurized air into a tire (e.g., over 1000 minutes), the number of minutes may constitute an assessment of the magnitude of the degradation event. Similarly, a high number of inflation events or pressure checks may indicate poor seal health.

Alternatively, the central computer may retrieve from a database the set of all previous degradation events recorded for the air seal, information which may include the timestamps of each degradation event. The new degradation determination from the degradation test may be added to the set of previous degradation events, and the central computer may assess any changes to the rate of degradation events for that air seal over the lifetime of the air seal. For example, as described earlier in graph 400, the central computer may compare the rate of degradation events over a first duration with the rate of degradation events over a second duration to determine if an air seal degradation frequency threshold has been passed (e.g., seal evidences degradation each time a test is performed). At 708, the health of the air seal is determined by assessing the frequency of degradation events in comparison with historical data from a plurality of air seals and/or aggregate air seal health data collected over time. A comparison against historical data can be used to determine the precise moment at which seals should be replaced. The degradation event rates may be compared by comparing curves fitting the data, or the rates may be compared as ratios relative to a total number of tests performed or degradation rates expressed as percentages.

For example, in one embodiment, the central computer may determine that based on historical air seal degradation models, when the ratio of total degradation events to number of tests performed exceeds a threshold frequency value of 60%, the health of the air seal is determined to be unacceptable. In another embodiment, the central computer may mathematically compare a curve determined by time series data collected for a given air seal over time with curves determined by time series data collected for air seals that have reached the end of their useful lives. The health of the air seal may be determined by the extent to which the curve determined by time series data collected for a given air seal matches that of degraded air seals.

At 710, the air seal health data for the relevant air seal is sent back to the vehicle, where a notification may be displayed on a display device as described above in method 500. For example, the electronic control unit in the vehicle may notify the operator (e.g., driver) of the vehicle that an air seal is an advanced stages of degradation by displaying notification on a display device on operator control device such as operator control device 224 in FIG. 2. After the health of the air seal has been determined and any appropriate instructions or notifications have been sent back to the vehicle, at 712 the central computer may determine whether air seal data should be evaluated in conjunction with environmental factors, such as the quality and/or temperature of the road terrain, vehicle, and/or air, and so forth. For example, in the case of a tire inflation system such as tire inflation system 10 of FIG. 1 operating in a single vehicle independently of other vehicles, under consistent road and environmental conditions, air seal health may be assessed without considering temperature ranges, terrain, or other environmental factors. However, in other examples, the degradation tests described herein may account for ambient pressure and/or temperature. For example, the tire pressure measurements described herein may be corrected based on ambient temperature and/or ambient pressure. As an example, if a tire is measured as having a pressure of 21 psi during conditions where ambient temperature is high (e.g., 33° C.), the measured pressure may be adjusted (e.g., lowered to 19 psi) to allow the pressure measurement to more closely correspond with prior and/or future tire pressure measurements conducted at lower ambient temperatures. In such a case, the corrected tire pressure may actually be indicative of a degraded seal, due to the corrected tire pressure being at 19 psi.

In the case where a tire inflation system such as tire inflation system 10 of FIG. 1 is in operation across numerous vehicles, operated by a cloud-based fleet management system, over a variety of different terrains and roads and under different environmental conditions, it may be advantageous to assess air seal health data may under equality of conditions. In such cases, at 714 the central computer receives any available vehicle/road/temperature data from the vehicle, and proceeds to specifically compare degradation event trends across vehicles at 716 and or across roads/terrain at 718. The vehicle/road/temperature data may be collected by sensors onboard each vehicle (e.g., ambient temperature sensors, ambient pressure sensors, vehicle navigation systems) and/or by GPS, location services, vehicle to vehicle and/or vehicle to infrastructure communication systems, weather services, and the like.

For example, a fleet of buses that operates some vehicles in a region that is very hot may wish to assess air seal health data as a function of temperature. In such cases, in order to determine how well a given air seal is performing under hot conditions, a central computer may selectively compare the degradation event rate of an air seal exposed to very high temperatures with the degradation event rates of other seals exposed to very high temperatures, but not to the degradation event rates of other seals that are not exposed to very high temperatures. Additionally and alternatively, in order to determine how well air seals in general perform under hot conditions as opposed to cooler conditions, a central computer may selectively compare the degradation event rate of air seals exposed to very high temperatures with the degradation event rate of air seals only exposed to cooler temperatures. Similarly, sensor data from wheels, axles, or elements of the suspension may be used to selectively compare degradation event rates of a given seal to the degradation event rates of seals subject to similar terrain conditions.

Once the health of the air seal has been determined, either in comparison with historical models created from aggregate air seal health data compiled from a plurality of vehicles over longer time periods, and/or in further comparison with historical models of air seal health data compiled from data from any relevant subgroups based on temperature, surface quality, etc., at 720 the air seal degradation model is updated with the addition of the new data point. In this way, the central computer is engaged in a constant process of refining the air seal degradation model that uses as the basis for assessing future degradation test data.

At 722, any relevant information regarding the air seal being assessed may be notified to an operator on a control or display device such as operator control device 226 of schematic diagram 200 (as well as the operator of the vehicle via a display device such as control device 224 of schematic diagram 200, as mentioned earlier). Alternatively or additionally, this may include information determined from the updating of the air seal degradation model, or information from any of the comparisons with historical models carried out at 708, 716, and 718. For example, a remote operator of a central computer such as central computer 222 of tire inflation system 10 may be notified that an air seal in a vehicle has exceeded a degradation threshold value and needs to be replaced, or that air seals of vehicles used in high temperature conditions are degrading more slowly than in the past, in response to lower driving speeds.

Thus, a tire inflation system such as tire inflation system 10 of FIG. 1 provides for an assessment of rotary air seal health based on an electronic control unit and one or more pressure sensors fluidly coupled to one or more tires via wheel valves that can be opened and closed to selectively monitor or evaluate loss of pressure in tires due to air seal degradation, as opposed to tire degradation events such as punctures. It should be appreciated that while the embodiments presented herein envision air seal health assessments as carried out at a central, remote location by a computer connected via a server and a telematics device to one or more vehicles with a plurality of air seals/tires, a tire inflation system such as tire inflation system 10 of FIG. 1 could also be operated independently entirely within an electronic control unit in a vehicle. Further, communication between an electronic control unit in a vehicle and a central computer at a remote location may be asynchronous and/or irregular, such that some of the tasks described in methods 500, 600, and 700 as being carried out on a central computer may be carried out by the electronic control unit and periodically uploaded to the central computer. Tire inflation system 10 thus comprises a flexible system, within which the problem of assessing the health of individual rotary air seals in a single moving vehicle and the problem of determining optimal conditions for air seal longevity can be efficiently divided between a mobile processor and a remote processor, to address air seal health across a variety of vehicles and external conditions.

The technical effect of determining the health of a seal in a tire inflation system is that degraded seals may be identified and replaced, which may prolong the life of the tire inflation system and allow the vehicle to remain operational even when tire issues are present (e.g., punctures). A technical effect of offboarding the pressure measurements to a remote computer network/centralized computer is that seal degradation may be determined without using the limited resources onboard the vehicle. A further technical effect of offboarding the pressure measurements to the remote computer network/centralized computer is that the pressure measurements may compared to historical models, pressure measurements from other vehicles, etc., which may increase the accuracy of the determination of the seal health.

An embodiment is directed to a method of determining the health of a seal of a tire inflation system on a vehicle, including obtaining one or more pressure measurements of a tire of the vehicle with a pressure transducer in communication with an electronic control unit; and sending the one or more pressure measurements to a computer network via a communication network that receives signals from the electronic control unit, the communication network including a telematics device in communication with the computer network, wherein the computer network is configured to determine the health of the seal based on the one or more pressure measurements communicated by the telematics device. In a first example of the method, the computer network is configured to determine that the seal is degraded responsive to at least one of the one or more pressure measurements being less than a threshold pressure. In a second example of the method, which optionally includes the first example, the threshold pressure is 20 psi. In a third example of the method, which optionally includes one or both of the first and second examples, the one or more pressure measurements comprise three pressure measurements performed sequentially over a duration, and wherein the computer network is configured to determine if the seal is degraded responsive to each of the three pressure measurements being less than the threshold pressure. In a fourth example of the method, which optionally includes one or more or each of the first through third examples, the computer network is configured to determine a rate of degradation of the seal based on the one or more pressure measurements and indicate that the seal is degraded in response to the rate of degradation exceeding a threshold rate. In a fifth example of the method, which optionally includes one or more or each of the first through fourth examples, the computer network is configured to send a notification to the telematics device in response to determining that the seal is degraded. In a sixth example of the method, which optionally includes one or more or each of the first through fifth examples, obtaining one or more pressure measurements of the tire with the pressure transducer comprises opening one or more valves coupled between the tire and the pressure transducer, to fluidly couple the tire to the pressure transducer via the seal. In a seventh example of the method, which optionally includes one or more or each of the first through sixth examples, the seal is a rotary seal coupled between a stationary component and a rotating component of the tire inflation system. While the one or more pressure measurements are described herein as being one or more pressure measurements of a tire, it is to be understood that in some examples, such as when the seal is degraded, the tire is not fluidly coupled to the pressure transducer and thus the one or more pressure measurements include one or more pressure measurements of a tire channel coupled between the tire and the pressure transducer.

An embodiment relates to a system, including a tire inflation system comprising a pressure transducer in communication with an electronic control unit, the pressure transducer configured to be fluidly coupled to a tire via a seal, the electronic control unit storing instructions executable to obtain a plurality of pressure measurements of the tire from the pressure transducer, and a communication network configured to receive signals from the electronic control unit, the communication network including a telematics device configured to be in communication with a computer network, the telematics device configured to send the plurality of pressure measurements to the computer network and receive, from the computer network, a notification indicating the seal is degraded based on the plurality of pressure measurements. In a first example of the system, the seal is a rotary seal coupling a stationary component to a rotating component of the tire inflation system. In a second example of the system, which optionally includes the first example, the tire inflation system further comprises a pressurized air source fluidly coupled to the tire via the seal and one or more valves. In a third example of the system, which optionally includes one or both of the first and second examples, the computer network is configured to determine that the seal is degraded responsive to at least one of the plurality of pressure measurements being less than a threshold pressure. In a fourth example of the system, which optionally includes one or more or each of the first through third examples, the computer network is configured to determine a rate of degradation of the seal based on the plurality of tire pressure measurements and indicate that the seal is degraded in response to the rate of degradation exceeding a threshold rate.

An embodiment is directed to a method for a tire inflation system of a vehicle, the method including at a first point in time, opening one or more valves fluidly coupled between a tire and a pressure sensor, the tire configured to be fluidly coupled to a tire channel, and obtaining a first pressure of the tire channel with the pressure sensor; if the first pressure is less than a threshold pressure, maintaining the one or more valves open and providing pressurized air to the tire via a seal of the tire inflation system; at a second point in time, opening the one or more valves and obtaining a second pressure of the tire channel with the pressure sensor; at a third point in time, opening the one or more valves and obtaining a third pressure of the tire channel with the pressure sensor; and outputting a notification indicating degradation of the seal responsive to at least one of the first pressure, the second pressure, and the third pressure being less than a threshold pressure. In a first example of the method, outputting the notification comprises outputting the notification responsive to each of the first pressure, the second pressure, and the third pressure being less than the threshold pressure. In a second example of the method, which optionally includes the first example, the method further includes outputting a notification indicating potential degradation of the tire responsive to the first pressure being less than the threshold pressure and one or both of the second and third pressures being equal to or greater than the threshold pressure. In a third example of method, which optionally includes one or both of the first and second examples, the second point in time is later than the first point in time and the third point in time is later than the second point in time. In a fourth example of the method, which optionally includes one or more or each of the first through third examples, the first point of time is at vehicle startup. In a fifth example of the method, which optionally includes one or more or each of the first through fourth examples, the one or more valves comprises a valve assembly coupled between a pressurized air source and the tire channel, wherein the tire is fluidly coupled to the tire channel via a wheel valve, and wherein when a pressure of the tire channel is greater than a valve opening pressure, the wheel valve opens to fluidly couple the tire to tire channel. In a sixth example of the method, which optionally includes one or more or each of the first through fifth examples, the method further includes outputting the notification indicating degradation of the seal responsive to an amount of time pressurized air is provided to the tire being greater than a threshold amount of time.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of determining a health of a seal of a tire inflation system on a vehicle, comprising:
   obtaining one or more pressure measurements of a tire of the vehicle with a pressure transducer in communication with an electronic control unit; and
   sending the one or more pressure measurements to a computer network via a communication network that receives signals from the electronic control unit, the communication network including a telematics device in communication with the computer network,
   wherein the computer network is configured to determine the health of the seal based on the one or more pressure measurements communicated by the telematics device, and
   wherein the health of the seal is determined to be degraded if the sent one or more pressure measurements continuously meet a threshold pressure and then fall below the threshold pressure within a certain period of time during operation of the vehicle.

2. The method of claim 1, wherein the threshold pressure is 20 pounds per square inch (psi).

3. The method of claim 1, wherein the one or more pressure measurements comprise three pressure measurements performed sequentially over a duration, and wherein the computer network is configured to determine if the seal is degraded responsive to each of the three pressure measurements being less than the threshold pressure.

4. The method of claim 1, wherein the computer network is configured to determine a rate of degradation of the seal based on the one or more pressure measurements and indicate that the seal is degraded in response to the rate of degradation exceeding a threshold rate.

5. The method of claim 1, wherein the computer network is configured to send a notification to the telematics device in response to determining that the seal is degraded.

6. The method of claim 1, wherein obtaining one or more pressure measurements of the tire with the pressure transducer comprises opening one or more valves coupled between the tire and the pressure transducer, to fluidly couple the tire to the pressure transducer via the seal.

7. The method of claim 6, wherein the seal is a rotary seal coupled between a stationary component and a rotating component of the tire inflation system.

8. A system, comprising:
   a tire inflation system comprising a pressure transducer in communication with an electronic control unit, the pressure transducer configured to be fluidly coupled to a tire via a seal, the electronic control unit storing instructions executable to obtain a plurality of pressure measurements of the tire from the pressure transducer;
   a communication network configured to receive signals from the electronic control unit, the communication network including a telematics device configured to be in communication with a computer network, the telematics device configured to send the plurality of pressure measurements to the computer network and receive, from the computer network, a notification indicating the seal is degraded if one or more of the plurality of pressure measurements continuously meet a threshold pressure and then fall below the threshold pressure within a certain period of time during operation of the vehicle.

9. The system of claim 8, wherein the seal is a rotary seal coupling a stationary component to a rotating component of the tire inflation system.

10. The system of claim 9, wherein the tire inflation system further comprises a pressurized air source fluidly coupled to the tire via the seal and one or more valves.

11. The system of claim 8, wherein the computer network is configured to determine that the seal is degraded responsive to at least one of the plurality of pressure measurements being less than a threshold pressure.

12. The system of claim 8, wherein the computer network is configured to determine a rate of degradation of the seal based on the plurality of pressure measurements and indicate that the seal is degraded in response to the rate of degradation exceeding a threshold rate.

* * * * *